(12) United States Patent
Küpper et al.

(10) Patent No.: US 6,685,801 B2
(45) Date of Patent: Feb. 3, 2004

(54) CHAMBERED CIRCULATION EVAPORATOR

(75) Inventors: Kurt-Manfred Küpper, Leverkusen (DE); Andre Fellhölter, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/146,998

(22) Filed: May 16, 2002

(65) Prior Publication Data

US 2002/0175066 A1 Nov. 28, 2002

(30) Foreign Application Priority Data

May 22, 2001 (DE) .......................... 101 24 904

(51) Int. Cl.$^7$ .............. B01D 1/00; B01D 3/10
(52) U.S. Cl. ............ 202/205; 202/185.1; 159/901; 159/DIG. 16; 159/DIG. 80
(58) Field of Search .............. 159/901, 40, DIG. 16, 159/43.1; 202/237, 205, 185.1; 203/91, 98

(56) References Cited

U.S. PATENT DOCUMENTS

| | | | |
|---|---|---|---|
| 2,798,543 A | * 7/1957 | Cook | 159/27.2 |
| 4,294,652 A | * 10/1981 | Newman | 159/2.1 |
| 4,925,526 A | * 5/1990 | Havukainen | 159/13.3 |
| 5,415,732 A | * 5/1995 | Catelli | 159/47.1 |
| 6,066,232 A | 5/2000 | Mohr et al. | 159/13.3 |
| 6,365,005 B1 | * 4/2002 | Schleiffarth | 203/1 |

FOREIGN PATENT DOCUMENTS

| | | |
|---|---|---|
| FR | 1419663 | 12/1965 |
| FR | 2 564 330 | 11/1985 |

OTHER PUBLICATIONS

English translation of France 1,419,663.*
CZ–Chemie–Technik, Annual Set 2, (month unavailable) 1973, pp. 254–260, Von Hermann Stage, "Fettsäure–Geradeausdestillation und–Fraktionierung unter dem Gesichtswinkel der Wirtschaftlichkeit".
WLB Wasser, Luft und Boden, 6, (month unavailable) 1992, Joachim Gebel, "Gülle–Aufbereitung: umweltgerecht und wirtschaftlich", pp. 20–26.
Brennst.–Wärme–Kraft vol. 4, No. 6, (month unavailable) 1992, "Zwangumlaufverdampfer im GUD–Prozeβ und in Druckaufgeladenen Systemen", B. Gericke, pp. 247–256.
Brennst.–Wärme–Kraft, vol. 44, No. 7/8 Jul./Aug. 1992, , "Zwangumlaufverdampfer im GUD–Prozeβ und in Druck-aufgeladenen Systemen", B. Gericke.

* cited by examiner

Primary Examiner—Virginia Manoharan
(74) Attorney, Agent, or Firm—Joseph C. Gil; Thomas W. Roy; Gary F. Matz

(57) ABSTRACT

A circulation evaporator for separating mixtures having more volatile and less volatile components. The circulation evaporator contains an evaporator, a discharge container connected to the evaporator by a connecting piece, a condenser, a vacuum pump, a recirculating line, a feed line and an outflow line. The discharge container contains a chamber for feed and a chamber for outflow. The invention further relates to a process for the separation by distillation of a mixture having more volatile and less volatile components by employing the circulation evaporator.

2 Claims, 3 Drawing Sheets

(Prior Art)

CHAMBERED CIRCULATION EVAPORATOR

BACKGROUND OF THE INVENTION

The invention relates to a circulation evaporator for separating mixtures of more volatile and less volatile components, which comprises a discharge container containing at least two chambers. The invention further relates to a process for the separation by distillation of a mixture consisting of a more volatile and a less volatile components.

Circulation evaporators according to the state of the art generally contain an evaporator and a discharge container connected via a connecting piece to said evaporator, a condenser, a vacuum pump, a recirculating line, which connects the discharge container to the evaporator and contains a circulation pump, a feed line for the raw mixture and an outflow line for the purified mixture. The outflow of the purified mixture in this case is generally undertaken from the discharge container; the feed of the raw mixture is generally undertaken into the recirculating line, through which the mixture is pumped from the discharge container to the evaporator. A circulation evaporator according to the state of the art is represented in FIG. 1.

Typical examples of circulation evaporators according to the state of the art are described, for example, in Dr Hermann Stage, Fettsäure-Geradeausdestillation und-Fraktionierung unter dem Gesichtswinkel der Wirtschaftlichkeit, CZ-Chemie-Technik, Annual Set 2, pages 254–260 [1973]; Joachim Gebel, Gülle-Aufbereitung: umweltgerecht und wirtschaftlich, WLB, Wasser, Luft und Boden 6, pages 20–26 [1992]; B. Gericke, Zwangsumlaufverdampfer im GUD-Prozeß und Druckaufgeladenen Systemen, Part 1: Atmosphärischer GUD-Verdampfer, Brennst.-Wärme-Kraft, Vol. 4, No. 6, pages 247–256 [1992] and B. Gericke, Zwangsumlaufverdampfer im GUD-Prozeß und in druckaufgeladenen Systemen, Part 2: Druckaufgeladener Kohlegas-Verdampfer, Brennst.-Wärme-Kraft, Vol. 44, No. 7/8, pages 295–304 [1992].

If circulation evaporators are used for separating lacquer-resin/isocyanate mixtures, it is necessary to work at quite high temperatures and at low absolute pressures in order to adjust the desired purity of the lacquer resin. In order to avoid excessive temperatures, the circulation evaporators have to make a large evaporation surface available. This results in large items of apparatus and long dwell-times.

In the case of excessive temperatures and excessive residence-times under temperature loading a partial decomposition of the lacquer resin can occur, as well as a change in the color of the lacquer resin, manifesting itself in an increase in the color index.

It is an object of the present invention to provide a circulation evaporator with which the evaporation temperature can be lowered and the thermal load on the mixture consisting of more volatile and less volatile components can be diminished. It is another object of the invention to provide a process for the separation by distillation of a mixture containing more volatile and less volatile components at reduced evaporation temperature.

SUMMARY OF THE INVENTION

The invention relates to a circulation evaporator containing an evaporator and a discharge container connected via a connecting piece to said evaporator, a condenser, a vacuum pump, a recirculating line, which connects the discharge container to the evaporator and contains a pump, a feed line for a raw mixture, and an outflow line for the purified mixture, wherein the discharge container contains at least a chamber for the feed and a chamber for the outflow, and the chamber for the outflow, to which the outflow line for the purified mixture is connected, is directly connected to the connecting piece for the discharge of the unevaporated liquid from the evaporator, and the chamber for the feed, into which the feed line for the raw mixture leads, is directly connected to the condenser.

The invention will be described in exemplary manner on the basis of the following Figures.

DETAILED DESCRIPTION OF THE INVENTION

The invention relates to a circulation evaporator containing an evaporator and a discharge container connected via a connecting piece to said evaporator, a condenser, a vacuum pump, a recirculating line, which connects the discharge container to the evaporator and contains a pump, a feed line for the raw mixture and an outflow line for the purified mixture, characterized in that the discharge container consists at least of a chamber for the feed and of a chamber for the outflow, the chamber for the outflow, to which the outflow line for the purified mixture is connected, being directly connected to the connecting piece for the discharge of the unevaporated liquid from the evaporator, and the chamber for the feed, into which the feed line for the raw mixture leads, being directly connected to the condenser.

In one possible embodiment the two chambers of the discharge container are connected in parallel and are both connected to the evaporator via the connecting piece and both comprise a connection to the pipeline.

Figure 1:
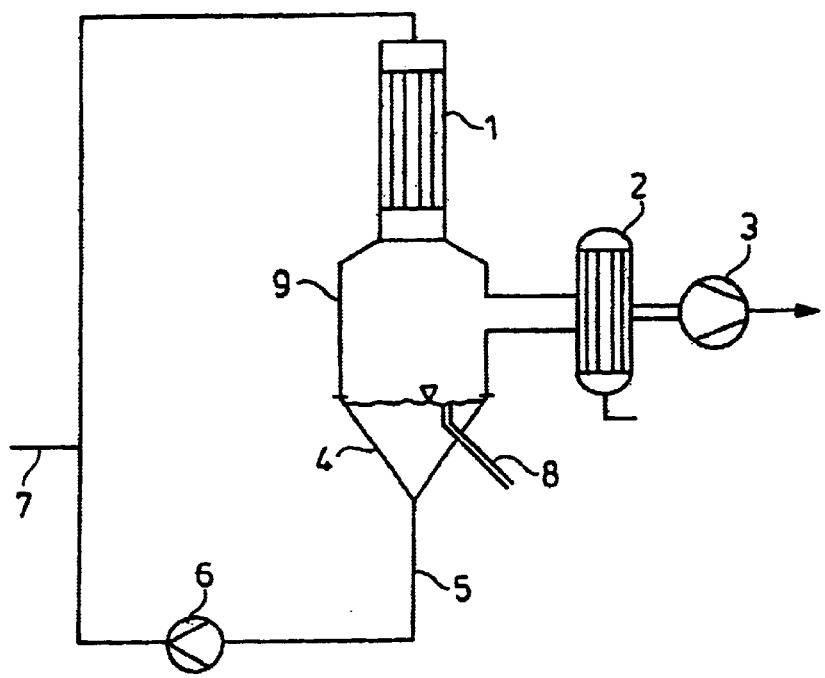
FIG. 1 shows a circulation evaporator according to the state of the art.
Figure 2:
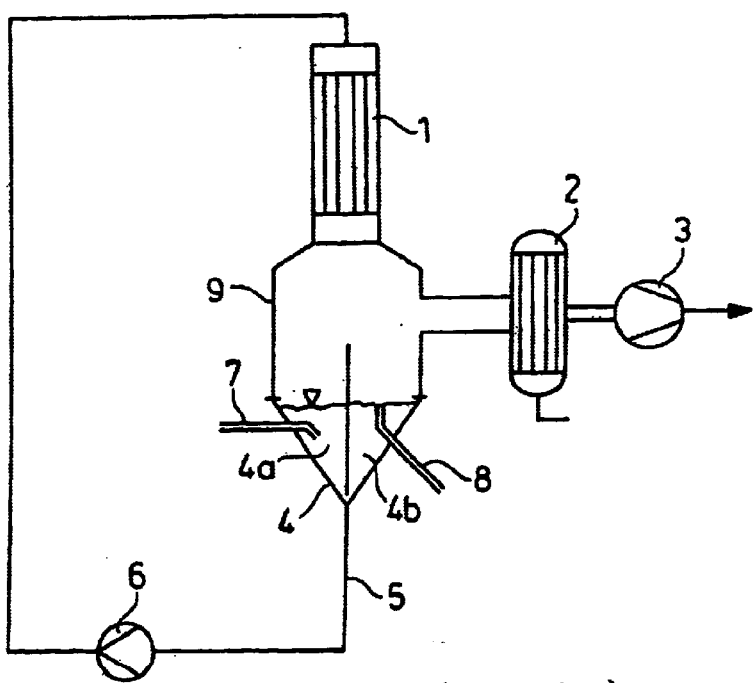
FIG. 2 shows a circulation evaporator according to the invention with chambers of the discharge container interconnected in parallel.
Figure 3:
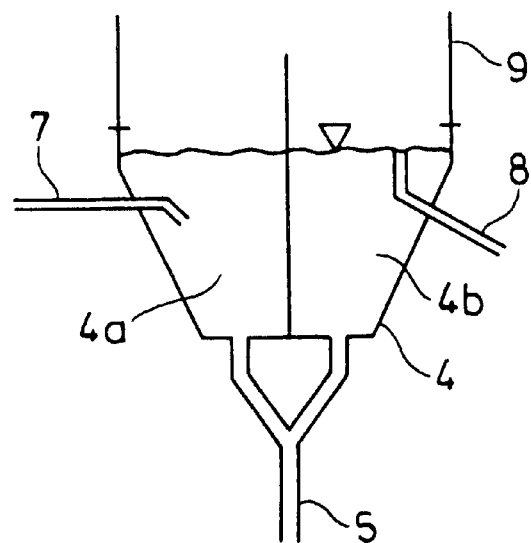
FIG. 3 shows an alternative embodiment of a discharge container with chambers interconnected in parallel.
Figure 4:
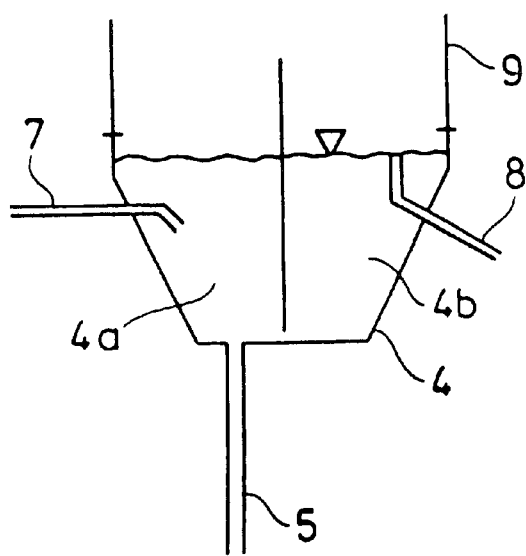
FIG. 4 shows an alternative embodiment of a discharge container with chambers interconnected in parallel.

An embodiment of the invention, as shown in FIG. 2, is directed to a circulation evaporator that includes an evaporator (1) and a discharge container (4), which is connected via a connecting piece (9) to evaporator (1), a condenser (2), a vacuum pump (3), a recirculating line (5), which connects the discharge container (4) to the evaporator (1) and contains a pump (6), a feed line (7), and an outflow line (8). Discharge container (4) includes a chamber for the feed (4a) and a chamber for the outflow (4b). Chamber for the outflow (4b), to which the outflow line (8) for the purified mixture is connected, is connected to connecting piece (9). Chamber for the feed (4a), into which feed line (7) for the raw mixture leads, is connected to condenser (2) via connecting piece (9). The two chambers (4a and 4b) of discharge container (4) are connected in parallel, and are both connected to evaporator (1) via connecting piece (9) and both include a connection to recirculating line (5).

Figure 5:
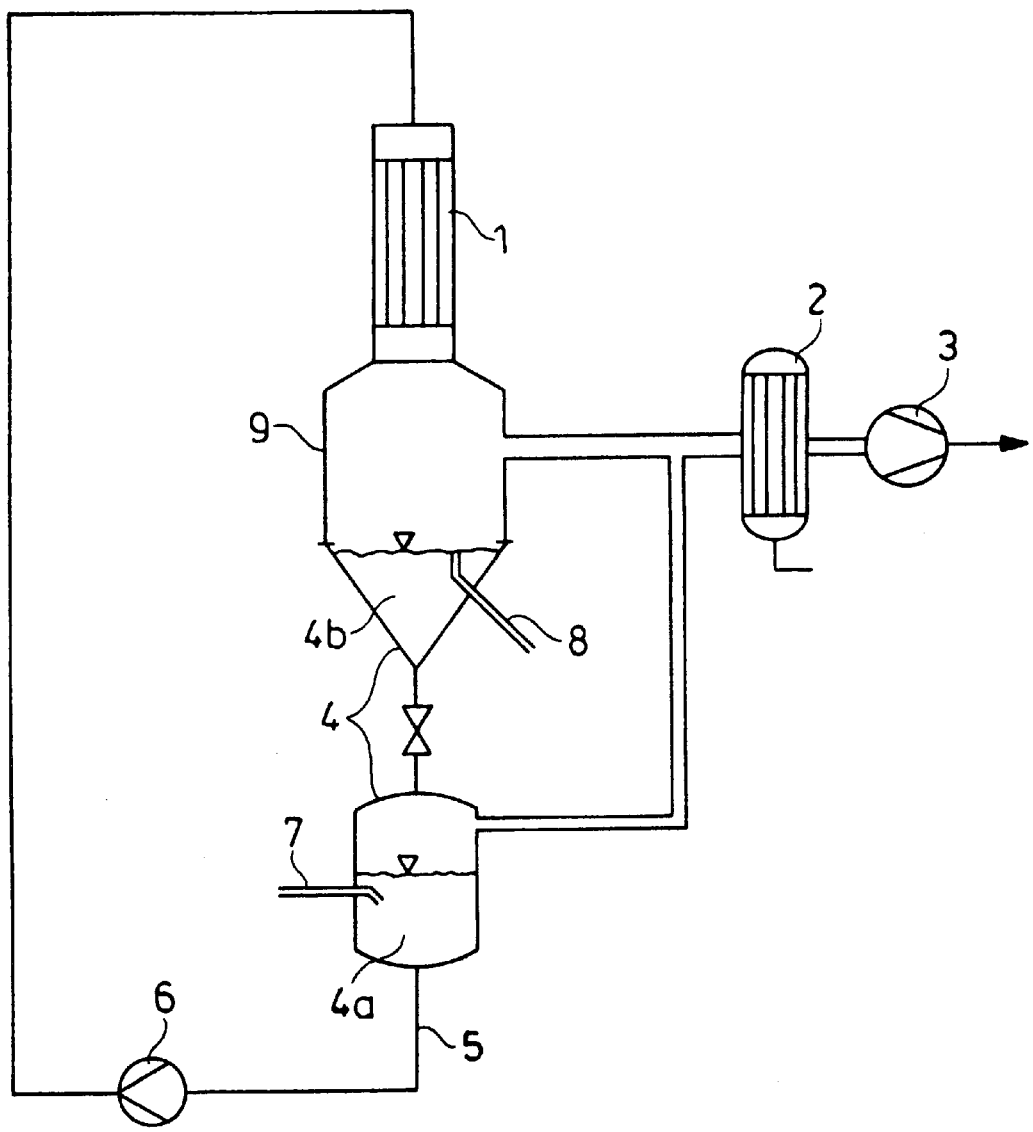
FIG. 5 shows a circulation evaporator with serially interconnected chambers of the discharge container.

Alternatively, the two chambers (4a and 4b) of discharge container (4) can be connected serially, as shown in FIG. 5, and chamber for the feed (4a) is arranged downstream of chamber for the outflow (4b).

The invention also relates to a continuous process for the separation by distillation of a mixture containing a more volatile and a less volatile component, wherein a circulation evaporator is employed with serially interconnected chambers of the discharge container, wherein the raw mixture is supplied to the chamber for the feed of the discharge container through the feed line, in said chamber 1 to 95%, preferably 10 to 80%, of the more volatile component are evaporated and recondensed in the condenser and ejected from the condenser, the unevaporated portion is charged to the evaporator via a pipeline, in said evaporator 10 to 99%, preferably 50 to 90%, of the more volatile component are evaporated and recondensed in the condenser and ejected from the condenser, the unevaporated portion is charged to the chamber for the outflow of the discharge container, from which a portion of the purified mixture is withdrawn via the outflow line, and the remainder of the purified mixture is charged into the chamber for the feed of the discharge container.

The portion of the purified mixture that is withdrawn via the outflow line from the chamber for the outflow of the discharge container is—in continuous, steady-state operation—equal to the difference formed from the mass flux of raw mixture supplied through the feed line and the mass flux condensed in the condenser and ejected.

In one embodiment of the process the raw mixture is preheated prior to entering the discharge container, so that a relatively large quantity of the more volatile component is evaporated in the chamber for the feed.

In another embodiment of the process the circulation evaporator is operated in such a way that the raw mixture flows into the chamber for the feed of the discharge container below the level of the liquid, so that the quantity of raw mixture that has flown in is rapidly heated up as a result of mixing with the purified mixture and the more volatile component is able to evaporate. In this connection, the closer the location of the feed of the raw mixture to the level of the liquid, the greater the proportion of low-boiling component that evaporates in the chamber for the feed of the discharge container, caused by the declining static pressure in the liquid mixture.

Alternatively, the circulation evaporator can also be operated in such a way that, for example, preheated raw mixture flows into the chamber for the feed of the discharge container above the level of the liquid.

The higher the temperature of the raw mixture supplied, the greater the proportion of evaporated low-boiling component in the chamber for the feed of the discharge container.

In one embodiment of the invention, the ratio of the mass flux of mixture circulated through the recirculating line to the mass flux of raw mixture supplied through the feed line amounts to 1 to 100, preferably 3 to 20.

The circulation evaporator is preferably operated at reduced pressure, preferably at an absolute pressure from 1 to 100 mbar, in particularly preferred manner from 2 to 10 mbar.

The process is particularly suitable for the separation of one or more isocyanates, preferably hexamethylene diisocyanate, from lacquer resins or other polyurethanes or mixtures thereof. Mixtures that can be separated with the circulation evaporator according to the state of the art are also suitable for separation in the chambered circulation evaporator according to the invention. Well suited, in particular, are the polyisocyanates with biuret and/or isocyanurate and/or allophanate and/or urethane and/or uretdione structures that are used conventionally for polyurethane lacquer applications or mixed types with the stated structural elements.

EXAMPLES

Example 1

Separation by Distillation of Hexamethylene Diisocyanate from a Mixture of Polyisocyanates with Isocyanurate and Uretdione Structure A circulation evaporator according to FIG. 2 was employed for the distillation. A mass flux of 800 kg/h having the composition 29 wt. % lacquer resin and 71 wt. % hexamethylene diisocyanate with a temperature of 120° C. was conducted as feed 7 into the chamber for the feed 4a of the discharge container 4 and mixes in said chamber with the liquid discharge from the evaporator 1, which discharges into the chamber for the discharge 4b and into the chamber for the feed 4a of the discharge container 4 with a temperature of 150° C. In the process, a portion of the hexamethylene diisocyanate that was introduced with the feed 7 into the chamber for the feed 4a was evaporated.

The mass flux that was evaporated from the evaporator 1 and from the chamber for the feed 4a of the discharge container 4 was conveyed by the vacuum pump 3, which generates an absolute pressure of 10 mbar, into the. condenser 2 and was condensed therein. The mass flux that was ejected from the condenser 2 amounts to 530 kg/h and had the composition of 100 wt. % hexamethylene diisocyanate.

The mass flux that was discharged via the outflow line 8 from the chamber for the discharge 4b of the discharge container 4 amounts to 270 kg/h and had the composition of 86 wt. % lacquer resin and 14 wt. % hexamethylene diisocyanate.

The chamber 4b for the discharge and the chamber 4a for the feed were connected to one another in communicating manner.

The pump 6 conveyed a mass flux of about 7000 kg/h at a temperature of 140° C. out of the two chambers 4a and 4b of the discharge container 4 to the top of the evaporator 1 through the recirculating line 5.

Example 2

Separation by Distillation of Hexamethylene Diisocyanate from a Mixture of Polyisocyanates with Biuret Structure A circulation evaporator according to FIG. 2 was employed for the distillation. A mass flux of 1450 kg/h having the composition 42 wt. % lacquer resin and 58 wt. % hexamethylene diisocyanate with a temperature of 145° C. was conducted as feed 7 into the chamber for the feed 4a of the discharge container 4 and mixed in said chamber with the liquid discharge from the evaporator 1, which discharged into the chamber for the discharge 4b and into the chamber for the feed 4a of the discharge container 4 with a temperature of 165° C. In the process, a portion of the hexamethylene diisocyanate that was introduced with the feed 7 into the chamber for the feed 4a was evaporated.

The mass flux that was evaporated from the evaporator 1 and from the chamber for the feed 4a of the discharge container 4 was conveyed by the vacuum pump 3, which generated an absolute pressure of 10 mbar, into the condenser 2 and was condensed therein. The mass flux that was ejected from the condenser 2 amounts to 800 kg/h and has the composition of 100 wt. % hexamethylene diisocyanate.

The mass flux that was discharged via the outflow line 8 from the chamber for the discharge 4b of the discharge container 4 amounts to 650 kg/h and had the composition of 94 wt. % lacquer resin and 6 wt. % hexamethylene diisocyanate.

The chamber 4b for the discharge and the chamber 4a for the feed were connected to one another in communicating manner.

The pump 6 conveyed a mass flux of about 10,000 kg/h at a temperature of 155° C. out of the two chambers 4a and 4b of the discharge container 4 to the top of the evaporator 1 through the recirculating line 5.

What is claimed is:

1. A circulation evaporator comprising
   (a) an evaporator, producing an evaporated portion and an unevaporated portion,
   (b) a discharge container connected via a connecting piece to said evaporator,
wherein the discharge container comprises a chamber for feed and a chamber for outflow,
   (c) a condenser, connected by the connecting piece to the evaporator,
   (d) a vacuum pump, connected to the condenser,
   (e) a recirculating line, which connects the discharge container to the evaporator and includes a pump,
   (f) a feed line, connected to the chamber for feed, and
   (g) an outflow line, connected to the chamber for outflow, wherein the chamber for outflow and the chamber for feed are connected in parallel; wherein the chamber for outflow and the chamber or feed are each connected to the evaporator via the connecting piece and both configured to receive the unevaporated portion from the evaporator; and wherein the chamber for outflow and the chamber for feed each comprise a connection to the recirculating line.

2. A circulation evaporator comprising
   (a) an evaporator, producing an evaporated portion and an unevaporated portion,
   (b) a discharge container connected via a connecting piece to said evaporator, wherein the discharge container comprises a chamber for feed and a chamber for outflow,
   (c) a condenser, connected by the connecting piece to the evaporator,
   (d) a vacuum pump, connected to the condenser,
   (e) a recirculating line, which connects the discharge container to the evaporator and includes a pump,
   (f) a feed line, connected to the chamber for feed, and
   (g) an outflow line, connected to the chamber for outflow, wherein the chamber for outflow is directly connected to the connecting piece, and is configured to receive the unevaporated portion from the evaporator, wherein the chamber for feed is in fluid communication with the condenser, wherein the chamber for outflow and the chamber for feed are connected serially; and
wherein the chamber for feed is arranged downstream of the chamber for outflow.

* * * * *